United States Patent
Wang

(10) Patent No.: US 10,885,625 B2
(45) Date of Patent: Jan. 5, 2021

(54) RECOGNIZING DAMAGE THROUGH IMAGE ANALYSIS

(71) Applicant: Advanced New Technologies Co., Ltd., Grand Cayman (KY)

(72) Inventor: Meng Wang, Hangzhou (CN)

(73) Assignee: Advanced New Technologies Co., Ltd., Grandy Cayman (KY)

( * ) Notice: Subject to any disclaimer, the term of this patent is extended or adjusted under 35 U.S.C. 154(b) by 0 days.

(21) Appl. No.: 16/813,355

(22) Filed: Mar. 9, 2020

(65) Prior Publication Data

US 2020/0357111 A1 Nov. 12, 2020

Related U.S. Application Data

(63) Continuation of application No. PCT/CN2020/071675, filed on Jan. 13, 2020.

(30) Foreign Application Priority Data

May 10, 2019 (CN) .......................... 2019 1 0388548

(51) Int. Cl.
*G06K 9/00* (2006.01)
*G06T 7/00* (2017.01)
(Continued)

(52) U.S. Cl.
CPC .......... *G06T 7/0004* (2013.01); *G06N 20/00* (2019.01); *G06T 1/0014* (2013.01);
(Continued)

(58) Field of Classification Search
CPC . G06T 7/12; G06T 7/11; G06T 7/0002; G06T 2207/20076; G06T 2207/30248;
(Continued)

(56) References Cited

U.S. PATENT DOCUMENTS 8,488,181 B2   7/2013 Wu et al.
9,824,453 B1 * 11/2017 Collins .............. G06K 9/00671
(Continued)

FOREIGN PATENT DOCUMENTS

CN      106096670      11/2016
CN      106897742       6/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Tom Y Lu
(74) *Attorney, Agent, or Firm* — Fish & Richardson P.C.

(57) ABSTRACT

Implementations of this specification provide for recognizing damage through image analysis. An example method includes obtaining a marked picture, the marked picture including one or more damage mark boxes, each damage mark box framing a respective portion of the marked picture depicting a damaged object; using a damage detection model to predict at least one damage prediction region in the marked picture, the at least one damage prediction region including a first damage prediction region; determining a location loss term related to a location deviation in a loss function for a current prediction, including determining whether any of the one or more damage mark boxes fully encompasses the first damage prediction region; and updating the damage detection model based on the loss function, such that the damage detection model is adjusted to reduce deviations between damage mark boxes and damage prediction regions.

19 Claims, 5 Drawing Sheets

(51) Int. Cl.
*G06T 1/00* (2006.01)
*G06N 20/00* (2019.01)
(52) U.S. Cl.
CPC .............. *G06T 2207/30108* (2013.01); *G06T 2207/30204* (2013.01); *G06T 2207/30248* (2013.01)
(58) Field of Classification Search
CPC . G06T 2207/20084; G06T 2207/20081; G06T 2207/30204; G06K 9/6261
See application file for complete search history.

(56) References Cited

U.S. PATENT DOCUMENTS

| 10,580,075 | B1* | 3/2020 | Brandmaier | G06Q 40/08 |
|---|---|---|---|---|
| 2013/0329052 | A1 | 12/2013 | Chew | |
| 2020/0074178 | A1* | 3/2020 | Guo | G06K 9/6273 |
| 2020/0074215 | A1* | 3/2020 | Wang | G07C 5/008 |
| 2020/0074560 | A1* | 3/2020 | Xu | G06T 7/0002 |

FOREIGN PATENT DOCUMENTS

| CN | 107657224 | 2/2018 |
|---|---|---|
| CN | 108197658 | 6/2018 |
| CN | 108537215 | 9/2018 |
| CN | 108711148 | 10/2018 |
| CN | 108921811 | 11/2018 |
| CN | 109087294 | 12/2018 |
| CN | 109117831 | 1/2019 |
| CN | 109190631 | 1/2019 |
| CN | 109308681 | 2/2019 |
| CN | 109377508 | 2/2019 |
| CN | 109389640 | 2/2019 |
| CN | 109409365 | 3/2019 |
| CN | 109657716 | 4/2019 |
| CN | 110569703 | 12/2019 |
| WO | WO 2019028725 | 2/2019 |

OTHER PUBLICATIONS

Nakamoto, "Bitcoin: A Peer-to-Peer Electronic Cash System," www.bitcoin.org, 2005, 9 pages.
Chen, "Vehicle Detection and Vehicle type Identification Algorithm Based on Convolutional Neural Network," China's Master's These Full-text Database, Sep. 2018, 72 pages (with English abstract).
PCT International Search Report and Written Opinion in International Application No. PCT/CN2020/071675, dated Apr. 15, 2020, 12 pages (with partial machine translation).
Tian et al., "Borescope Detection of Damage of Blade in Aeroengine Based on Image Recognition Technology," Proceedings of the Second International Symposium on Test Automation & Instrumentation, Nov. 2008, 3:1694-1698.
Yang, "A System of License Plate Recognition Using Deep Learning," China Master's These Full-text Database, May 2018, 70 pages (with English abstract).

* cited by examiner

RECOGNIZING DAMAGE THROUGH IMAGE ANALYSIS

CROSS-REFERENCE TO RELATED APPLICATIONS

This application is a continuation of PCT Application No. PCT/CN2020/071675, filed on Jan. 13, 2020, which claims priority to Chinese Patent Application No. 201910388548.0, filed on May 10, 2019, and each application is hereby incorporated by reference in its entirety.

TECHNICAL FIELD

One or more implementations of the present specification relate to the field of machine learning, and in particular, to methods and apparatuses for recognizing damage from a picture by using machine learning.

BACKGROUND

With rapid development of machine learning, various artificial intelligence technologies have been applied to a plurality of scenarios to help people alleviate technical problems in corresponding scenarios. Computer vision image recognition technologies have been widely applied to a plurality of scenarios in a plurality of fields, for example, medical image analysis and intelligent vehicle damage recognition.

For example, in a conventional vehicle insurance claims scenario, an insurance company needs to designate a professional surveyor and a professional loss assessor to make a survey and assess a loss at an accident scene, provide a repair solution and a compensation amount for a vehicle, take a photo at the scene, and maintain the loss assessment photo for review by a reviewer at the back end. The insurance company needs to invest substantial manpower costs and expertise training costs due to manual survey and loss assessment. In terms of experience of an ordinary user, the claims period lasts for one to three days because the claims process involves taking a photo at the scene by the surveyor, assessing a loss by the assessor at the repair place, and reviewing the loss by the reviewer at the back end. Consequently, the user needs to wait for a long time, and user experience is poor. For such industry disadvantages, it is expected that the image recognition technologies can be used to automatically recognize, based on a damage picture taken by an ordinary user at a scene, a vehicle damage condition reflected in the picture, and automatically provide a repair solution. In this case, no manual survey, loss assessment, and loss review are needed, and therefore costs of the insurance company can be greatly reduced, and vehicle insurance claims experience of the ordinary user can be improved.

SUMMARY

One or more implementations of the present specification describe methods and apparatuses for training a damage recognition model to recognize damage from a picture, where training of the damage recognition model is optimized for a damage recognition scenario, which facilitates application of the damage recognition to whole picture analysis.

According to a first aspect, a computer-performed method for training a damage detection model is provided, and includes: obtaining a marked picture, where the marked picture includes at least one damage mark box that frames a damaged object; predicting at least one damage prediction region in the marked picture by using a damage detection model, where the at least one damage prediction region includes a first damage prediction region; determining a location loss term related to a location deviation in a loss function for current prediction, where the determining a location loss term related to a location deviation includes: determining whether there is a damage mark box that totally includes the first damage prediction region in the at least one damage mark box; and determining that the location loss term is 0 if there is a damage mark box that totally includes the first damage prediction region; or if there is no damage mark box that totally includes the first damage prediction region, determining a target damage mark box from the at least one damage mark box, and determining the location loss term based on at least a distance between a center of the first damage prediction region and a center of the target damage mark box; and updating the damage detection model based on the loss function, so that an updated loss function decreases.

In an implementation, the first damage prediction region is specifically a pixel corresponding to a first damage prediction point.

In this case, the determining whether there is a damage mark box that totally includes the first damage prediction region includes: determining whether coordinates of the first damage prediction point fall within a coordinate range of each damage mark box; the target damage mark box can be determined by using the following method: A distance between the first damage prediction point and a center of each damage mark box is determined, and a damage mark box corresponding to the shortest distance is used as the target damage mark box; and then, the location loss term is determined based on the shortest distance.

In another implementation, the first damage prediction region is specifically a first damage prediction box, and has a first center, a first width, and a first height.

In this case, whether the first damage prediction region is totally included in each damage mark box can be determined as follows:

Coordinates of four vertices of the first damage prediction box are determined based on the first center, the first width, and the first height; and whether the coordinates of the four vertices fall within a coordinate range of each damage mark box is determined.

In an example in the present implementation, the target damage mark box can be determined as follows:

An intersection area between the first damage prediction box and each damage mark box is determined; and the target damage mark box is determined from the at least one damage mark box based on the intersection area.

In an implementation of the present implementation, the first width is a predetermined width, and the first height is a predetermined height, and in this case, the location loss term can be determined based on a distance between the first center and the center of the target damage mark box.

In another implementation of the present implementation, the first width is a predicted with, and the first height is a predicted height; and in this case, the location loss term can be determined as follows:

A first loss term is determined based on a distance between the first center and the center of the target damage mark box; a second loss term is determined based on the predicted width and the predicted height; and the location loss term is determined based on the sum of the first loss term and the second loss term.

In a more specific example, the second loss term can be determined as the operation sum of the predicted width and the predicted height.

In another specific example, the target damage mark box has a mark width and a mark height; and corresponding, the second loss term can be determined as follows:

It is determined that a width loss term is 0 when the predicted width is not greater than the mark width; or a width loss term is determined based on a length by which the predicted width exceeds the mark width when the predicted width is greater than the mark width; it is determined that a height loss term is 0 when the predicted height is not greater than the mark height; or a height loss term is determined based on a length by which the predicted height exceeds the mark height when the predicted height is greater than the mark height; and the sum of the width loss term and the height loss term is used as the second loss term.

According to a second aspect, an apparatus for training a damage detection model is provided, and includes: an acquisition unit, configured to obtain a marked picture, where the marked picture includes at least one damage mark box that frames a damaged object; a prediction unit, configured to predict at least one damage prediction region in the marked picture by using a damage detection model, where the at least one damage prediction region includes a first damage prediction region; a determining unit, configured to determine a location loss term related to a location deviation in a loss function for current prediction, where the determining unit includes: a determining subunit, configured to determine whether there is a damage mark box that totally includes the first damage prediction region in the at least one damage mark box; and a first determining subunit, configured to determine that the location loss term is 0 if there is a damage mark box that totally includes the first damage prediction region; or a second determining subunit, configured to: if there is no damage mark box that totally includes the first damage prediction region, determine a target damage mark box from the at least one damage mark box, and determine the location loss term based on at least a distance between a center of the first damage prediction region and a center of the target damage mark box; and an update unit, configured to update the damage detection model based on the loss function, so that an updated loss function decreases.

According to a third aspect, a computer readable storage medium is provided, where the computer readable storage medium stores a computer program, and when the computer program is executed in a computer, the computer is enabled to perform the method according to the first aspect.

According to a fourth aspect, a computing device is provided, and includes a memory and a processor, where the memory stores executable code, and when the processor executes the executable code, the method according to the first aspect is implemented.

According to the methods and apparatuses provided in the implementations of the present specification, an improved method for training a damage detection model is provided. The objective of training is to make a damage prediction box fit a center location of a mark box, and is not to accurately fit a size of the mark box, so that the prediction box does not exceed the mark box as much as possible, or is even as small as possible. The damage detection model obtained by using this method is more suitable for unique features of damage recognition, and the damage detection model obtained by using this method facilitates subsequent combination with another detection result for whole picture analysis.

BRIEF DESCRIPTION OF DRAWINGS

To describe the technical solutions in the implementations of the present disclosure more clearly, the following briefly describes the accompanying drawings needed for describing the implementations. Clearly, the accompanying drawings in the following description show merely some implementations of the present disclosure, and a person of ordinary skill in the art can further derive other drawings from these accompanying drawings without creative efforts.

DESCRIPTION OF IMPLEMENTATIONS

Figure 1:
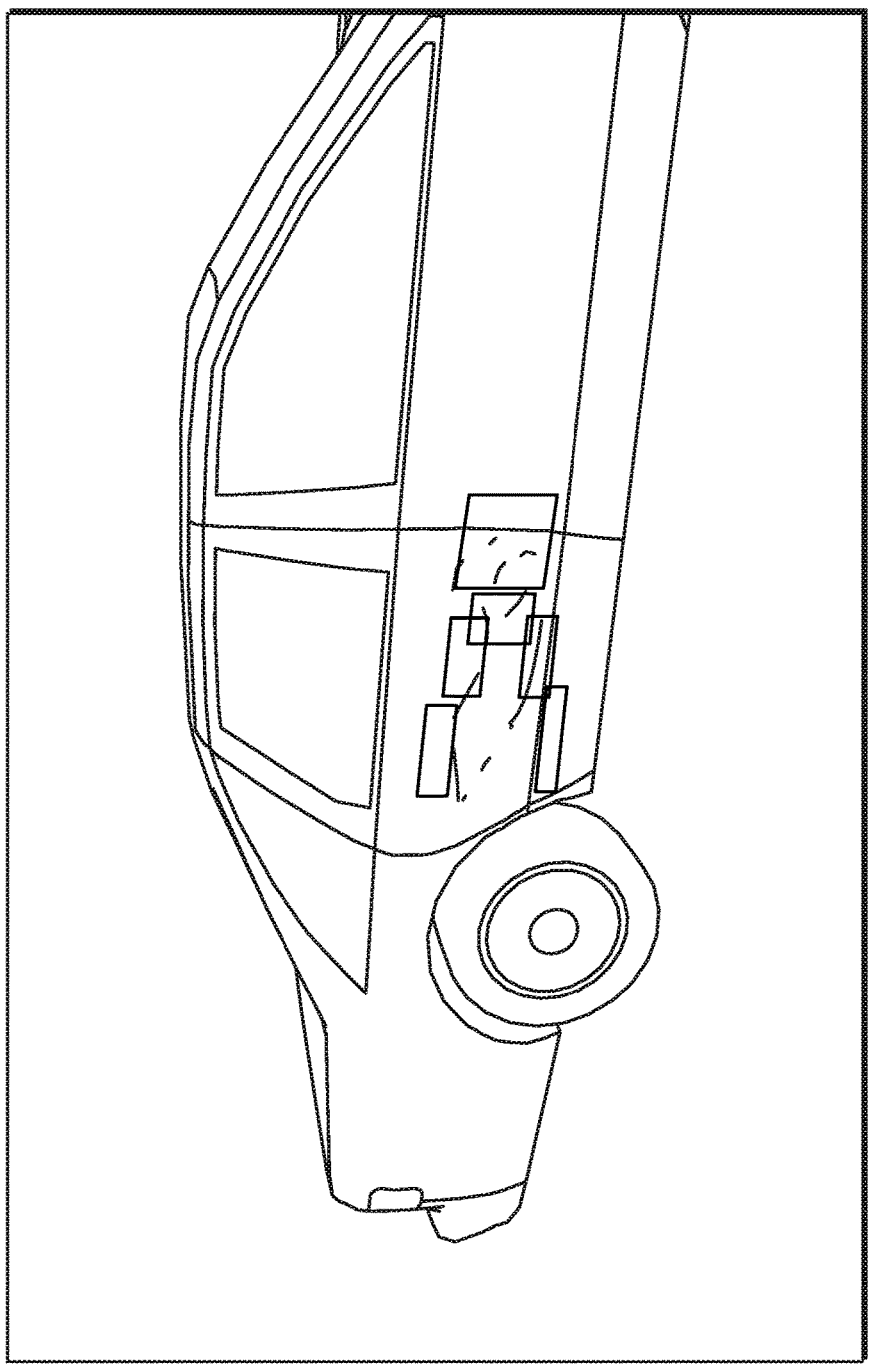
FIG. 1 illustrates a marked picture sample in which a vehicle damage picture is marked in an example.

The following describes the solutions provided in the present specification with reference to the accompanying drawings.

As described above, in a plurality of scenarios, image recognition needs to be performed by using computer vision technologies. A basic and typical task in image recognition is target detection. That is, a specific target object, for example, a face or an animal, is recognized from a picture, and the target object is classified. Therefore, model training can be performed by using a marked picture sample, and a target detection model obtained through training can detect and recognize a specific target object in an unknown picture. Specifically, the target detection model outputs a target detection box and a predicted type. The target detection box is a minimum rectangular box that frames a target object, and the predicted type is a type predicted for the target object framed by the target detection box.

In a plurality of scenarios such as intelligent vehicle loss assessment and medical image analysis, a damaged object, for example, vehicle damage or an organ lesion, needs to be recognized from a picture. In this case, the damaged object can be marked as a specific target object, and a damage detection model can be obtained by performing training based on an obtained marked picture sample. In other words, the damage detection model is a specific application of the target detection model, and damage is used as a target detection object in the damage detection model.

Correspondingly, a training process of the damage detection model is usually similar to a conventional training process of the target detection model. Specifically, a marker marks a damaged object in a picture by using a mark box, to obtain a training picture that includes several damage mark boxes. Then, damage recognition is performed on the training picture by using a preliminary damage detection model, to obtain several damage prediction boxes. Deviations between the predicted damage prediction box and the damage mark box marked by the marker are measured by using a loss function. The deviations usually include a deviation between predicted types, a deviation between a center of the prediction box and a center of the mark box, and a deviation between sizes. The damage detection model is updated based on the loss function, so that the damage detection model is adjusted to reduce the deviations. In other words, the objective of training is to make the damage prediction box fully fit the damage mark box. When the loss function is small enough and the damage prediction box is sufficiently fit the damage mark box, it is considered that model training is completed, and prediction can be performed for an unknown picture.

However, the inventor finds, through research and analysis, that in the damage recognition scenario, damage used as a to-be-recognized object has unique features. Correspondingly, the previous model training process can be further optimized to adapt to features of the damage recognition scenario. The following provides description with reference to an example of vehicle damage.

FIG. 1 illustrates a marked picture sample in which a vehicle damage picture is marked in an example. As can be seen from FIG. 1, vehicle damage is ambiguous, continuous, and self-contained, and is different from a conventional well-defined target. For example, for scratch damage on a vehicle, a continuous scratch can be considered as a damaged object, and a part of the scratch can also be considered as a damaged object (that is, so-called self-contained). Therefore, there is randomness in marking by a marker.

In addition, damage recognition is usually a step of picture analysis in a corresponding scenario, and needs to be combined with another detection result for subsequent analysis. For example, for vehicle loss assessment, attention is finally paid to a damaged component and a damage type. Therefore, a damage recognition result needs to be combined with a component recognition result, to obtain a component damage condition. In addition, for a specific component, a damage type usually corresponds to a replacement/repair solution. Therefore, the component damage condition only needs to be expressed as (component name, damage type), and a size of a damage region does not need to be accurately determined. For example, for (left front door, scratch), paint processing needs to be performed on the entire left front door regardless of a size of the scratched region, and therefore no attention is paid to the size of the damage region. There are similar features in medical image analysis. In medical image analysis, more attention is paid to an abnormal organ and a lesion/abnormality type, and no attention is paid to the exact size of the abnormal region.

In other words, because of features of a damaged object, a damage mark box is not accurate enough, and no attention is paid to a predicted damage size in most cases. Therefore, the inventor proposes that in the training process of a damage recognition model, it is not necessary to accurately fit the damage mark box. In addition, a damage detection model obtained by accurately fitting the damage mark box usually recognizes a damage prediction box with a size similar to that of the damage mark box. A cross-component case usually occurs because the size of the damage prediction box is not limited. For example, two components, namely, the front door and the rear door, are involved in the rightmost mark box in FIG. 1. This is unfavorable to subsequent combination with a component recognition result.

Based on the previous considerations and analysis, in the implementations of the present specification, an improved method for training a damage detection model is provided. The objective of training is to make a damage prediction box fit a center location of a mark box, and is not to accurately fit a size of the mark box, so that the prediction box does not exceed the mark box as much as possible, or is even as small as possible. The following describes a specific implementation and execution steps of the previous concept.

Figure 2:
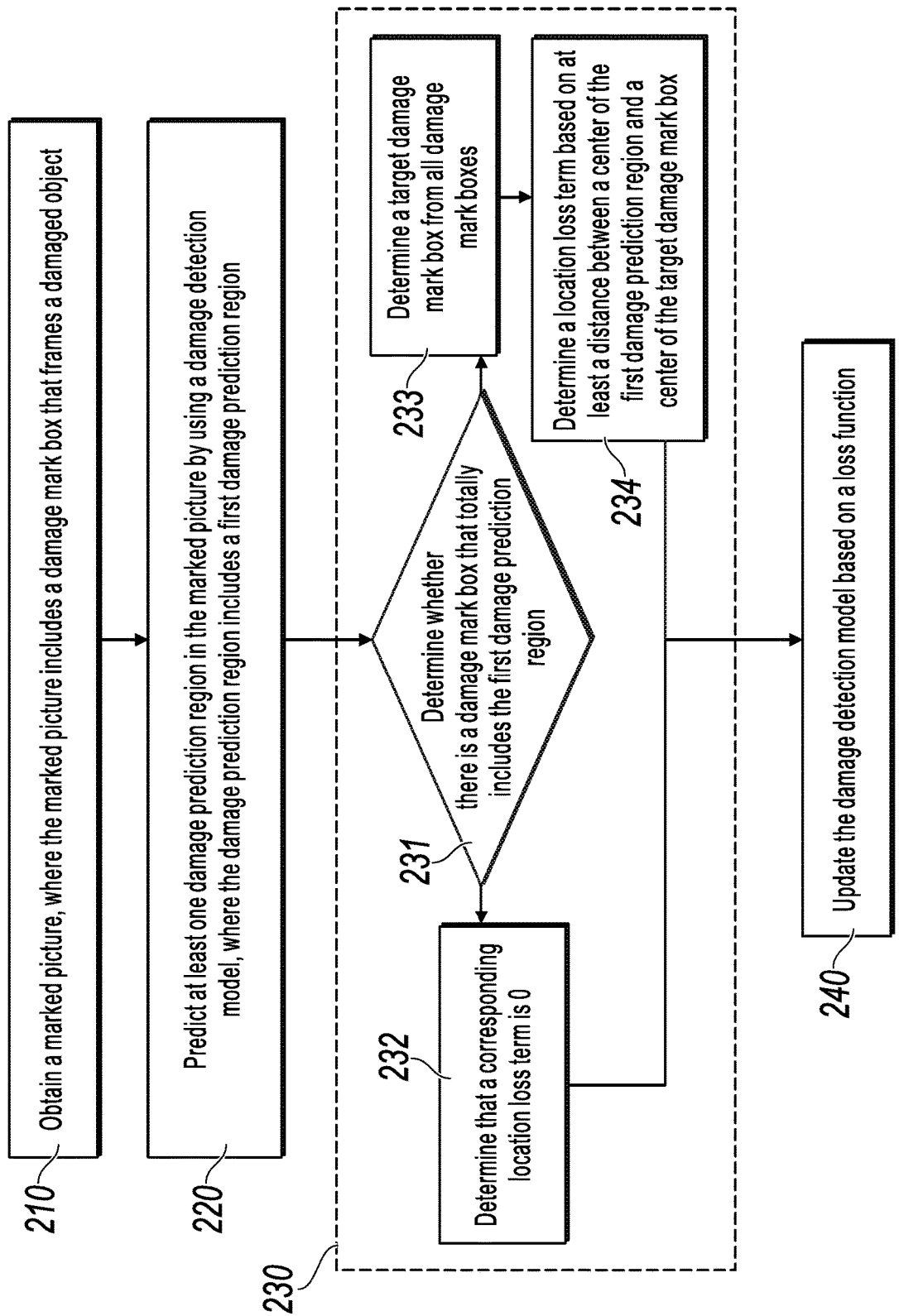
FIG. 2 is a flowchart illustrating a method for training a damage detection model, according to an implementation.

FIG. 2 is a flowchart illustrating a method for training a damage detection model, according to an implementation. The method can be performed by any apparatus, device, platform, or device cluster with computing and processing capabilities. As shown in FIG. 2, the method includes at least the following steps: Step 210: Obtain a marked picture, where the marked picture includes at least one damage mark box that frames a damaged object. Step 220: Predict at least one damage prediction region in the marked picture by using a damage detection model, where the at least one damage prediction region includes a first damage prediction region. Step 230: Determine a location loss term related to a location deviation in a loss function for current prediction based on information whether the first damage prediction region totally falls within the at least one damage mark box. Step 240: Update the damage detection model based on the loss function, so that an updated loss function decreases. The following describes implementations of the steps.

First, in step 210, the marked picture is obtained. The marked picture is usually a picture that is manually marked by a marker and used for model training. In a case of training the damage detection model, the marked picture includes the damage mark box that frames the damaged object, and there can be one or more damage mark boxes. As described above, FIG. 1 illustrates a damage marked picture in which a damaged object is marked, and the marked picture includes six damage mark boxes. Usually, each damage mark box can be expressed in a form of (X, Y, W, H), where X and Y respectively represent a horizontal coordinate and a vertical coordinate of a center location of the damage mark box, W represents a width of the damage mark box, and H represents a height of the damage mark box. In another example, the damage mark box can be alternatively expressed by using coordinates of four vertices of the damage mark box. In addition, it can be understood that the vertex expression method and the expression method of (X, Y, W, H) can be easily interchanged.

Then, in step 220, prediction is performed for the marked picture by using the damage detection model, to obtain the at least one damage prediction region. It can be understood that the damage detection model in step 220 is a model in a training process, and can be an initial model that includes initial parameters, or can be an intermediate model obtained after several times of parameter optimization are performed.

As described above, the damage detection model is a specific application of a target detection model. In the art, various target detection models have been provided based on various network structures and various detection algorithms. For example, a one-stage detection model can directly determine a type probability and location coordinates of a target object from a picture, in other words, directly recognize the target object. Typical examples of the one-stage detection model include an SSD model, a Yolo model, etc. A two-stage detection model first generates a candidate region, or referred to as a region of interest (ROI), in a picture, and then performs target recognition and box regression in the candidate region. Typical examples of the two-stage detection model include an R-CNN model, a fast R-CNN model, a faster R-CNN model, etc. Other target detection models are further provided. Each of these specific model structures and algorithms can be used as the damage detection model.

Prediction is performed for the marked picture by using the damage detection model, to obtain a prediction result, namely, several damage prediction regions and corresponding predicted damage types. To train and optimize the model, the prediction result is compared with mark data to determine the loss function. The comparison usually includes a comparison between types and a comparison between locations. Correspondingly, the loss function includes a type loss term related to a type deviation and the location loss term related to the location deviation. According to the implementations of the present specification, the type loss term can be determined by using a conventional method. For example, a predicted type of the damage prediction region is compared with a mark type of the corresponding damage mark box, and the type loss term is determined based on a comparison result. Different from a fitting objective of considering both a center deviation and a size deviation in a conventional solution, in the one or more implementations of the present specification, the location loss term in the loss function is determined based on the information whether the damage prediction region totally falls within the damage mark box.

Therefore, in step 230, the location loss term related to the location deviation in the loss function for the current prediction is determined based on the previous concept. For simplicity of description, description is provided with reference to any damage prediction region, which is referred to as the first damage prediction region in the following.

Specifically, as shown in FIG. 2, step 230 of determining a location loss term includes the following steps: Step 231: Determine whether there is a damage mark box that totally includes the first damage prediction region. Step 232: Determine that the location loss term corresponding to the first damage prediction region is 0 if there is any damage mark box that totally includes the first damage prediction region. Step 233: Determine a target damage prediction region from the at least one damage prediction region. Step 234: Determine the location loss term based on at least a distance between a center of the first damage prediction region and a center of the target damage mark box.

With reference to different forms of the damage prediction region, the following describes a specific execution process of determining the location loss term in different implementations.

In an implementation, only center coordinates of the damage region are predicted in step 220. In this case, the obtained damage prediction region can be expressed as (x, y), and is degraded to a damage prediction point, or it is considered that the damage prediction region is a pixel corresponding to the damage prediction point. Correspondingly, the any first damage prediction region is specifically a pixel corresponding to a first damage prediction point, and can be expressed as $(x_1, y_1)$.

In this case, in step 231, only whether coordinate $(x_1, y_1)$ of the first damage prediction point fall within a coordinate range of each damage mark box needs to be determined. As described above, each damage mark box can be expressed by using four vertices, or coordinates of four vertices are obtained through conversion based on (X, Y, W, H). The coordinates of the four vertices can limit a coordinate range of the damage mark box. Therefore, in step 231, $(x_1, y_1)$ can be compared with the coordinate range of each damage mark box, to determine whether the first damage prediction point falls within a damage mark box.

If the first damage prediction point falls within any damage mark box, in step 232, it is determined that the location loss term corresponding to the first damage prediction point is 0.

If it is found, through comparison in step 231, that the first damage prediction point falls outside all of the damage mark boxes, in step 233, the target damage mark box is determined from the at least one damage mark box. Specifically, a distance between first damage prediction point $(x_1, y_1)$ and center $(X_1, Y_1)$ of each damage mark box can be calculated, and a damage mark box corresponding to the shortest distance is used as the target damage mark box. Assume that the center of the target damage mark box is $(X_1, Y_1)$.

Then, in step 234, the location loss term is determined based on a distance between first damage prediction point $(x_1, y_1)$ and center $(X_1, Y_1)$ of the target damage mark box, namely, the shortest distance.

In an example, location loss term L can be determined as the shortest distance, in other words, $$L = \sqrt{(x_1 - X_1)^2 + (y_1 - Y_1)^2} . \qquad (1)$$

In another example, location loss term L can be determined as the square of the shortest distance, in other words, $$L=(x_1-X_1)^2+(y_1-Y_1)^2 \qquad (2).$$

As such, the location loss term of the damage prediction point is determined.

According to a second implementation in step 220, width $w_0$ and height $h_0$ of the damage prediction region are fixed, and center coordinates (x, y) of the damage prediction region are predicted. In this case, the obtained damage prediction region is expressed as a rectangular damage prediction box with a fixed size, and the damage prediction box can be expressed as $(x, y, w_0, h_0)$. It is finally expected to obtain a small damage prediction box, and therefore the fixed width and height can be set to a small value, for example, both $w_0$ and $h_0$ are four pixels. Correspondingly, the any first damage prediction region is specifically a first damage prediction box, is expressed as $(x_1, y_1, w_0, h_0)$, and has first center $(x_1, y_1)$, fixed width $w_0$, and fixed height $h_0$.

In this case, in step 231, whether first damage prediction box $(x_1, y_1, w_0, h_0)$ totally falls within each damage mark box needs to be determined. Therefore, coordinates, for example, $$\left(x_1 - \frac{w_0}{2}, y_1 + \frac{h_0}{2}\right), \left(x_1 + \frac{w_0}{2}, y_1 + \frac{h_0}{2}\right),$$
$$\left(x_1 - \frac{w_0}{2}, y_1 - \frac{h_0}{2}\right), \text{ and } \left(x_1 + \frac{w_0}{2}, y_1 - \frac{h_0}{2}\right),$$

of four vertices of the first damage prediction box can be determined based on center coordinates $(x_1, y_1)$, width $w_0$, and height $h_0$ of the first damage prediction box.

As described above, coordinates of four vertices of each damage mark box can be obtained in advance, to obtain a coordinate range of each damage mark box. Whether the coordinates of the four vertices of the first damage prediction box fall within the coordinate range of each damage mark box can be determined. Only when the coordinates of the four vertices fall within a coordinate range of a damage mark box, it is considered that the first damage prediction box totally falls within or is included in the damage mark box. As such, whether the first damage prediction box totally falls within each damage mark box is determined.

If the first damage prediction box totally falls within any damage mark box, in step 232, it is determined that the location loss term corresponding to the first damage prediction box is 0.

If the first damage prediction box does not totally fall within each damage mark box, in other words, each damage mark box cannot totally include the first damage prediction box, in step 233, the target damage mark box is determined from all of the damage mark boxes, and is used as a comparison target for calculating a deviation loss for the first damage prediction box. The step can be performed in a plurality of ways.

Figure 3:
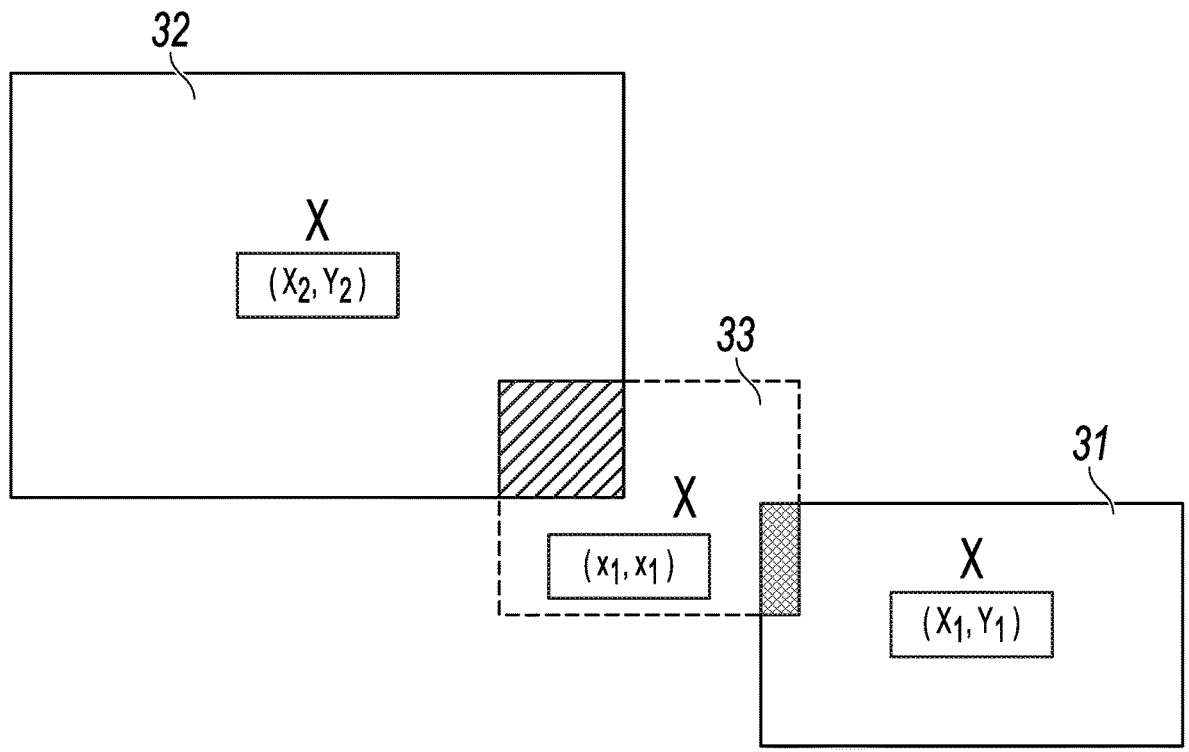
FIG. 3 is a schematic diagram illustrating determining a target damage mark box, according to an implementation.

FIG. 3 is a schematic diagram illustrating determining a target damage mark box, according to an implementation. In FIG. 3, two damage mark boxes 31 and 32 are illustrated by using solid lines, and one damage prediction box 33 is illustrated in a dotted line box. The damage mark box 31 can be expressed as $(X_1, Y_1, W_1, H_1)$, and the damage mark box 32 can be expressed as $(X_2, Y_2, W_2, H_2)$. In an example, the damage prediction box 33 is used as the first damage prediction box currently to be analyzed to describe the process of determining the target damage mark box.

In an example, a distance between center $(x_1, y_1)$ of the first damage prediction box and a center of each damage mark box can be calculated, and a damage mark box corresponding to the shortest distance is used as the target damage mark box.

For example, a distance between center $(x_1, y_1)$ of the damage prediction box 33 and each of $(X_1, Y_1)$ and $(X_2, Y_2)$ can be calculated. If the distance from $(X_1, Y_1)$ is smaller, the damage mark box 31 can be selected as the target damage mark box.

In another example, an intersection area between the first damage prediction box and each damage mark box can be determined. For example, intersection area S1 (shown in a grey part) between the damage prediction box 33 and the damage mark box 31 and intersection area S2 (shown in an oblique line part) between the damage prediction box 33 and the damage mark box 32 can be calculated.

Then, the target damage mark box is determined based on the intersection areas. For example, a damage mark box corresponding to the maximum intersection area can be used as the target damage mark box. For example, in such a case, the damage mark box 32 can be used as the target damage mark box. In another example, intersection-over-union (IoU), namely, a ratio of the intersection area to a union area, between the damage prediction box and the damage mark box is obtained based on the intersection area, and a damage mark box with the largest IoU is selected as the target damage mark box. In this case, in the example in FIG. 3, the damage mark box 31 can be used as the target damage mark box.

After the target damage mark box is determined, in step 234, the location loss term is determined based on a distance between the center of the first damage prediction box and the center of the target damage mark box. In the present implementation, the width and the height of the first damage prediction box are predetermined fixed values, and therefore a loss in terms of a size of the prediction box does not need to be considered, and only a loss in terms of a center location needs to be determined. For the loss in terms of the center location, the location loss term can be determined by using equation (1) or (2), where $(x_1, y_1)$ is center coordinates of the first damage prediction box, and $(X_1, Y_1)$ is center coordinates of the target damage mark box.

As such, the location loss term of the first damage prediction box with a fixed size is determined.

According to a third implementation, in step 220, both a center location and a size of the damage region are predicted to obtain a rectangular damage prediction box, which can be expressed as (x, y, w, h), where w is a predicted width, and h is a predicted height. This is similar to a conventional prediction process. Generated damage prediction boxes differ in size, and are constantly adjusted in the model training process. Correspondingly, the any first damage prediction region is specifically a first damage prediction box, is expressed as $(x_1, y_1, w_1, h_1)$, and has first center $(x_1, y_1)$, first width $w_1$, and first height $h_1$.

In this case, in step 231, whether first damage prediction box $(x_1, y_1, w_1, h_1)$ totally falls within each damage mark box is determined. Specifically, coordinates of four vertices of the first damage prediction box are determined based on the first center, the first width, and the first height of the first damage prediction box. Then, whether the coordinates of the four vertices fall within a coordinate range of each damage mark box is determined. A specific calculation and execution process is similar to that in the second implementation, and is omitted here for simplicity.

If the first damage prediction box totally falls within any damage mark box, in step 232, it is determined that the location loss term corresponding to the first damage prediction box is 0.

If each damage mark box cannot totally include the first damage prediction box, in step 233, the target damage mark box is determined from all of the damage mark boxes, and is used as a comparison target for calculating a deviation loss for the first damage prediction box. In different examples, the target damage mark box can be determined based on a distance between centers of the first damage prediction box and each damage mark box, an intersection area between the first damage prediction box and each damage mark box, intersection-over-union between the first damage prediction box and each damage mark box, etc. A specific calculation and execution process is similar to that in the second implementation, and is omitted here for simplicity. The target damage mark box is marked as $(X_1, Y_1, W_1, H_1)$.

After the target damage mark box is determined, in step 234, the location loss term is determined by comparing first damage prediction box $(x_1, y_1, w_1, h_1)$ with target damage mark box $(X_1, Y_1, W_1, H_1)$. In the present implementation, for the location loss term, both a loss caused by a center deviation of the prediction box and a loss caused by the size of the box need to be considered. Therefore, a first loss term, namely, a loss term in terms of the center deviation, can be determined based on a distance between the first center and the center of the target damage mark box. In an example, the first loss term can be calculated by using equation (1) or (2). In addition, a second loss term, namely, a loss term in terms of the size of the box, is further determined based on the width and the height of the first damage prediction box. Then, the location loss term is determined based on the sum of the first loss term and the second loss term.

More specifically, in an example, the second loss term can be determined as the operation sum, for example, the sum of squares, of width $w_1$ and predicted height $h_1$ of the first damage prediction box. Correspondingly, in an example, the location loss term can be expressed as:

$$L=(x_1-X_1)^2+(y_1-Y_1)^2+w_1^2+h_1^2 \qquad (3),$$ where $(x_1-X_1)^2+(y_1-Y_1)^2$ is used as the loss term in terms of the center deviation, and $w_1^2+h_1^2$ is used as the loss term in terms of the size of the box.

In another example, the second loss term in terms of the size of the box is further divided into a width loss term and a height loss term. For the width loss term, predicted width $w_1$ of the first damage prediction box is compared with mark width $W_1$ of the target damage mark box. If the predicted width is not greater than the mark width, it is determined that the width loss term is 0. If the predicted width is greater than the mark width, the width loss term is determined based on a length by which the predicted width exceeds the mark width. Similar processing is performed on the height. If predicted height $h_1$ is not greater than mark height $H_1$, it is determined that the height loss term is 0. If the predicted height is greater than the mark height, the height loss term is determined based on a length by which the predicted height exceeds the mark height. Finally, the sum of the width loss term and the height loss term is used as the second loss term in terms of the size of the box.

More specifically, in an example, the location loss term can be expressed as:

$$L=(x_1-X_1)^2+(y_1-Y_1)^2+\|\max(w_1-W_1,0)\|^2\|\max(h_1-H_1,0)\|^2 \quad (4).$$

In equation (4), $(x_1-X_1)^2+(y_1-Y_1)^2$ is used as the first loss term in terms of the center deviation, $\|\max(w_1-W_1, 0)\|^2 + \|\max(h_1-H_1, 0)\|^2$ is used as the second loss term in terms of the size of the box, and $\max(w_1-W_1, 0)$ represents selecting the larger value of $w_1-W_1$ and 0.

As such, the location loss term of the predicted any first damage prediction box is determined.

As described above, other loss terms in the loss function, such as a loss term of a predicted type, can be determined by using a conventional method. A loss term of each damage prediction region is determined by using this method, and the loss function corresponding to the current prediction can be obtained based on the sum of the loss terms of all of the damage prediction regions.

Referring back to FIG. 2, in step 240, the damage detection model is updated based on the loss function, so that the updated loss function decreases. The model can be updated by using a back propagation method, a gradient descent method, etc.

It can be understood that the objective of updating the damage detection model is to make the loss function as small as possible. Therefore, a method for defining the loss function, for example, different methods for determining the location loss term in the loss function, determines the objective of training the damage detection model. In short, based on the method for determining the location loss term in step 230 in FIG. 2, the predicted damage region is to be included in the damage mark box as much as possible, and is not required to fully fit the size of the mark box. Based on this, the obtained damage detection model predicts different damage prediction regions by using different types of location loss terms.

For example, when the location loss term in equation (1) or (2) is used, the obtained damage detection model can predict only the damage center point, so that the predicted damage center point falls within the damage mark box, or is as close as possible to the center of the damage mark box.

When the loss function is determined by using the location loss term determined by using equation (3), the obtained damage detection model predicts the damage box. To make the loss function as small as possible, the damage detection model is adjusted and optimized, so that width w and height h of the damage prediction box are as small as possible.

When the loss function is determined by using the location loss term determined by using equation (4), the obtained damage detection model predicts the damage box, and the damage detection model is adjusted, so that width w and height h of the damage prediction box do not exceed the width and the height of the mark box.

Parameters of the model are constantly adjusted and optimized by using this method to reduce the loss function, and finally, the optimized and updated damage detection model can be obtained.

Then, during operational phase, damage recognition can be performed on a to-be-examined picture by using the updated damage detection model.

Figure 4:
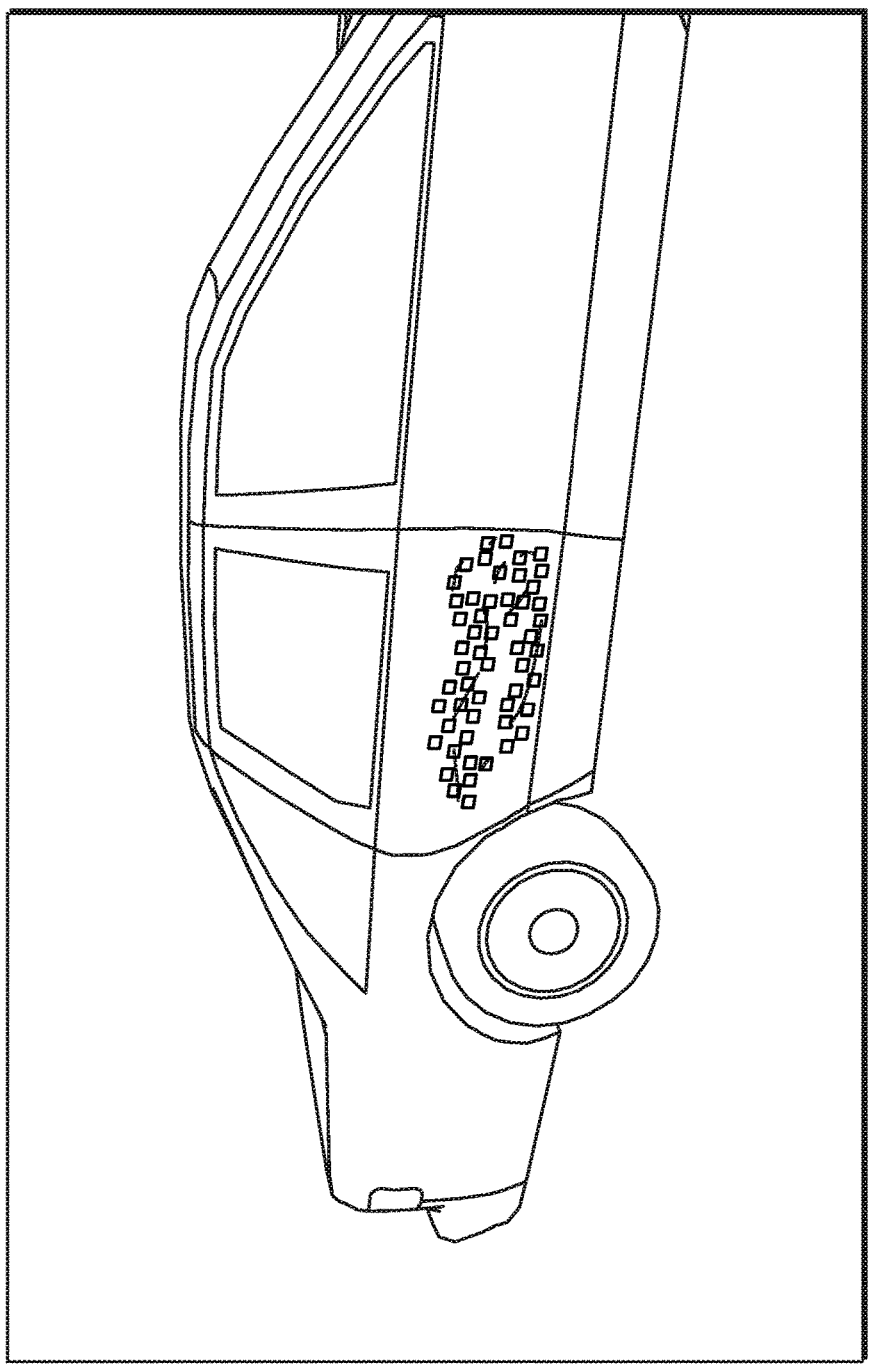
FIG. 4 illustrates a damage recognition result, according to an implementation.

FIG. 4 illustrates a damage recognition result, according to an implementation. In FIG. 4, a to-be-examined picture is a vehicle damage picture. When damage recognition is performed on the vehicle damage picture by using a damage detection model trained by using the previous method, a series of damage prediction boxes shown in the figure can be obtained. It can be seen that, unlike a prediction box that fully fits a size of a mark box in a conventional technology, the damage prediction box in FIG. 4 is very small, but still accurately indicates a location of damage. There is a very low probability that cross-component occurs in such a damage prediction box, which is very favorable to subsequent combination with a component detection result. Therefore, comprehensive loss assessment analysis of the whole picture is facilitated.

Figure 5:
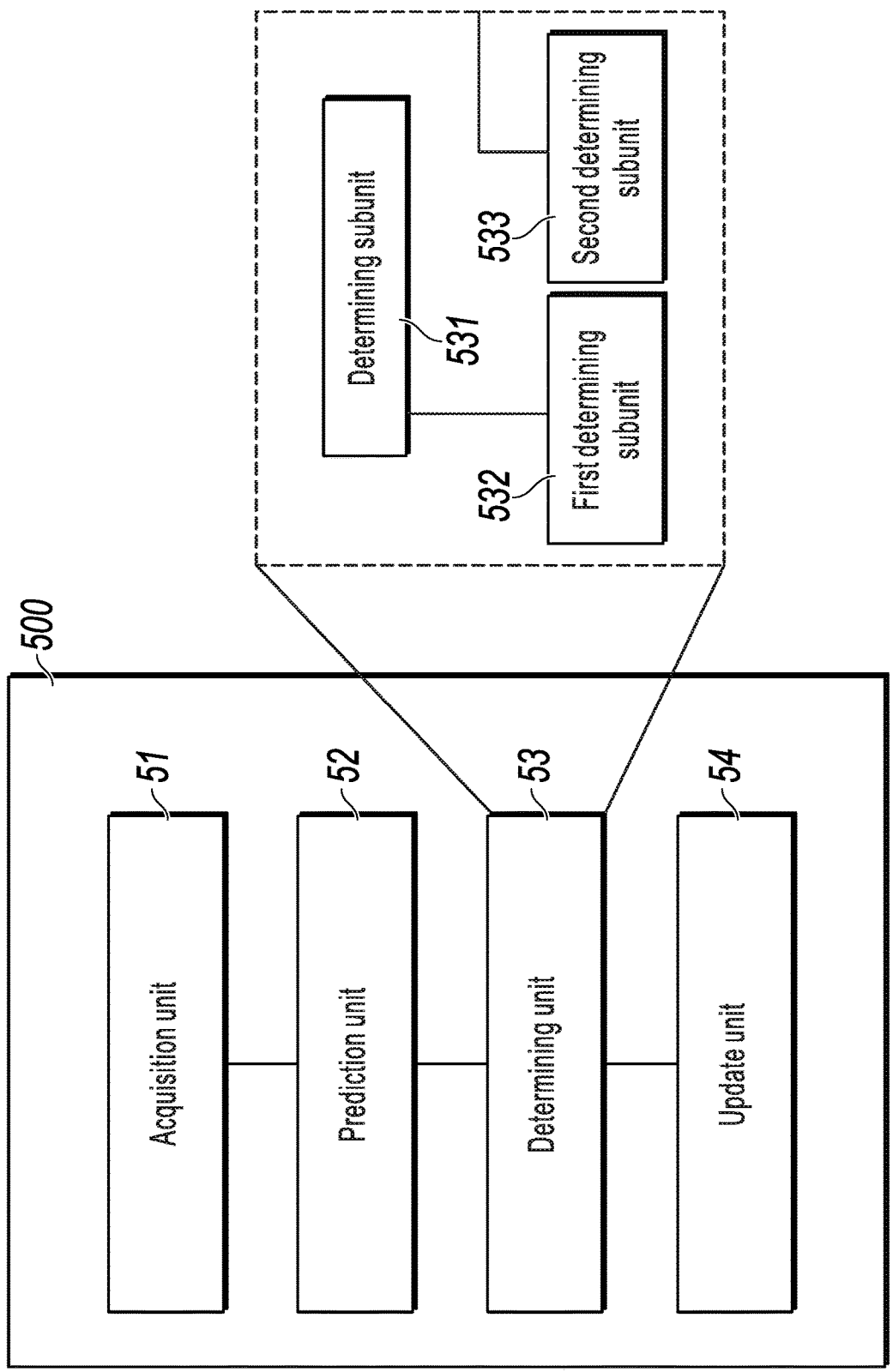
FIG. 5 is a schematic block diagram illustrating an apparatus for training a damage detection model, according to an implementation.

According to an implementation of another aspect, an apparatus for training a damage detection model is provided. The apparatus can be deployed in any device, platform, or device cluster with computing and processing capabilities. FIG. 5 is a schematic block diagram illustrating an apparatus for training a model, according to an implementation. As shown in FIG. 5, the apparatus 500 includes: an acquisition unit 51, configured to obtain a marked picture, where the marked picture includes at least one damage mark box that frames a damaged object; a prediction unit 52, configured to predict at least one damage prediction region in the marked picture by using a damage detection model, where the at least one damage prediction region includes a first damage prediction region; a determining unit 53, configured to determine a location loss term related to a location deviation in a loss function for current prediction, where the determining unit 53 includes: a determining subunit 531, configured to determine whether the first damage prediction region is totally included in each damage mark box; and a first determining subunit 532, configured to determine that the location loss term is 0 if there is any damage mark box that totally includes the first damage prediction region; or a second determining subunit 533, configured to: if each damage mark box cannot totally include the first damage prediction region, determine a target damage mark box from the at least one damage mark box, and determine the location loss term based on at least a distance between a center of the first damage prediction region and a center of the target damage mark box; and an update unit 54, configured to update the damage detection model based on the loss function, so that an updated loss function decreases.

In an implementation, the first damage prediction region is specifically a pixel corresponding to a first damage prediction point.

In an example in the present implementation, the determining subunit 531 is configured to determine whether coordinates of the first damage prediction point fall within a coordinate range of each damage mark box; and the second determining subunit 533 is configured to determine a distance between the first damage prediction point and a center of each damage mark box, use a damage mark box corresponding to the shortest distance as the target damage mark box, and determine the location loss term based on the shortest distance.

In another implementation, the first damage prediction region is specifically a first damage prediction box, and has a first center, a first width, and a first height.

In an example in the present implementation, the determining subunit 531 is configured to determine coordinates of four vertices of the first damage prediction box based on the first center, the first width, and the first height; and determine whether the coordinates of the four vertices fall within a coordinate range of each damage mark box.

In an example in the present implementation, the second determining subunit 533 is configured to determine an intersection area between the first damage prediction box and each damage mark box; and determine the target damage mark box from the at least one damage mark box based on the intersection area.

In an implementation, the first width is a predetermined width, and the first height is a predetermined height; and in this case, the second determining subunit 533 can be configured to determine the location loss term based on a distance between the first center and the center of the target damage mark box.

In another implementation, the first width is a predicted width, and the first height is a predicted height; and in this case, the second determining subunit 533 can further include the following modules (not shown): a first loss determining module, configured to determine a first loss term based on a distance between the first center and the center of the target damage mark box; a second loss determining module, configured to determine a second loss term based on the predicted width and the predicted height; and a third determining module, configured to determine the location loss term based on the sum of the first loss term and the second loss term.

In a more specific example, the second loss determining module is configured to determine the second loss term as the operation sum of the predicted width and the predicted height.

In another more specific example, the target damage mark box has a mark width and a mark height; and the second loss determining module is configured to: determine that a width loss term is 0 when the predicted width is not greater than the mark width; or determine a width loss term based on a length by which the predicted width exceeds the mark width when the predicted width is greater than the mark width; determine that a height loss term is 0 when the predicted height is not greater than the mark height; or determine a height loss term based on a length by which the predicted height exceeds the mark height when the predicted height is greater than the mark height; and use the sum of the width loss term and the height loss term as the second loss term.

A damage detection model that is more suitable for recognizing a damaged object is obtained through training by using the previous method and apparatus.

An implementation of the present specification further provides an apparatus for recognizing damage from a picture. The apparatus can include an acquisition unit, configured to obtain the previous trained damage detection model, and include a recognition unit, configured to perform damage recognition on a to-be-examined picture by using the damage detection model.

According to an implementation of another aspect, a computer readable storage medium is provided. The computer readable storage medium stores a computer program, and when the computer program is executed in a computer, the computer is enabled to perform the method described in FIG. 2.

According to an implementation of still another aspect, a computing device is further provided, and includes a memory and a processor. The memory stores executable code, and when the processor executes the executable code, the method described with reference to FIG. 2 is implemented.

A person skilled in the art should be aware that in the previous one or more examples, functions described in the present disclosure can be implemented by hardware, software, firmware, or any combination thereof. When the functions are implemented by software, the functions can be stored in a computer readable medium or transmitted as one or more instructions or code in a computer readable medium.

The objectives, technical solutions, and beneficial effects of the present disclosure are further described in detail in the previously described specific implementations. It should be understood that the previous descriptions are merely specific implementations of the present disclosure, and are not intended to limit the protection scope of the present disclosure. Any modification, equivalent replacement, or improvement made based on the technical solutions of the present disclosure shall fall within the protection scope of the present disclosure.

What is claimed is:

1. A computer-implemented method, comprising:
obtaining a marked picture, wherein the marked picture comprises one or more damage mark boxes, each damage mark box framing a respective portion of the marked picture depicting a damaged object;
using a damage detection model to predict at least one damage prediction region in the marked picture, wherein the at least one damage prediction region comprises a first damage prediction region;
determining a location loss term related to a location deviation in a loss function for a current prediction, wherein determining the location loss term related to the location deviation comprises determining whether any of the one or more damage mark boxes fully encompasses the first damage prediction region; and
updating the damage detection model based on the loss function, such that the damage detection model is adjusted to reduce deviations between damage mark boxes and damage prediction regions.

2. The computer-implemented method of claim 1, further comprising:
in response to determining that one of the one or more damage mark boxes fully encompasses the first damage prediction region, determining that the location loss term is zero.

3. The computer-implemented method of claim 1, further comprising:
in response to determining that none of the one or more damage mark boxes fully encompasses the first damage prediction region:
determining a target damage mark box from the one or more damage mark boxes; and
determining the location loss term based on at least a distance between a center of the first damage prediction region and a center of the target damage mark box.

4. The computer-implemented method of claim 3, wherein the first damage prediction region is a pixel corresponding to a first damage prediction point;
determining whether any of the one or more damage mark boxes totally include the first damage prediction region comprises determining whether coordinates of the first damage prediction point fall within a coordinate range of any of the one or more damage mark boxes;
determining the target damage mark box from the one or more damage mark boxes comprises determining a distance between the first damage prediction point and a center of each damage mark box, and selecting a damage mark box corresponding to a shortest distance as the target damage mark box; and determining the location loss term based on at least the distance between the center of the first damage prediction region and the center of the target damage mark box comprises determining the location loss term based on the shortest distance.

5. The computer-implemented method of claim 3, wherein the first damage prediction region is a first damage prediction box, the first damage prediction box having a first center, a first width, and a first height.

6. The computer-implemented method of claim 5, wherein determining whether any of the one or more damage mark boxes totally include the first damage prediction region comprises:

determining coordinates of four vertices of the first damage prediction box based on the first center, the first width, and the first height; and determining whether the coordinates of the four vertices fall within a coordinate range of any of the one or more damage mark boxes.

7. The computer-implemented method of claim 5, wherein determining the target damage mark box from the one or more damage mark boxes comprises:

determining an intersection area between the first damage prediction box and each damage mark box; and determining the target damage mark box from the one or more damage mark boxes based on the intersection area.

8. The computer-implemented method of claim 5, wherein the first width is a predetermined width, and the first height is a predetermined height; and determining the location loss term based on at least the distance between the center of the first damage prediction region and the center of the target damage mark box comprises determining the location loss term based on a distance between the first center and the center of the target damage mark box.

9. The computer-implemented method of claim 5, wherein the first width is a predicted width, and the first height is a predicted height; and determining the location loss term based on at least the distance between the center of the first damage prediction region and the center of the target damage mark box comprises:

determining a first loss term based on a distance between the first center and the center of the target damage mark box;

determining a second loss term based on the predicted width and the predicted height; and determining the location loss term based on a sum of the first loss term and the second loss term.

10. The computer-implemented method of claim 9, wherein determining the second loss term based on the predicted width and the predicted height comprises determining the second loss term as a sum of the predicted width and the predicted height.

11. The method according to claim 9, wherein the target damage mark box has a mark width and a mark height; and determining the second loss term based on the predicted width and the predicted height comprises:

determining a width loss term, such that (i) the width loss term is zero when the predicted width is not greater than the mark width, or (ii) the width loss term is based on an amount by which the predicted width exceeds the mark width when the predicted width is greater than the mark width;

determining a height loss term, such that (i) the height loss term is zero when the predicted height is not greater than the mark height, or (ii) the height loss term is based on an amount by which the predicted height exceeds the mark height when the predicted height is greater than the mark height; and using the sum of the width loss term and the height loss term as the second loss term.

12. A non-transitory, computer-readable medium storing one or more instructions executable by a computer system to perform operations comprising:

obtaining a marked picture, wherein the marked picture comprises one or more damage mark boxes, each damage mark box framing a respective portion of the marked picture depicting a damaged object;

using a damage detection model to predict at least one damage prediction region in the marked picture, wherein the at least one damage prediction region comprises a first damage prediction region;

determining a location loss term related to a location deviation in a loss function for a current prediction, wherein determining the location loss term related to the location deviation comprises determining whether any of the one or more damage mark boxes fully encompasses the first damage prediction region; and updating the damage detection model based on the loss function, such that the damage detection model is adjusted to reduce deviations between damage mark boxes and damage prediction regions.

13. The computer-readable medium of claim 12, the operations further comprising:

in response to determining that none of the one or more damage mark boxes fully encompasses the first damage prediction region:

determining a target damage mark box from the one or more damage mark boxes; and determining the location loss term based on at least a distance between a center of the first damage prediction region and a center of the target damage mark box.

14. The computer-readable medium of claim 13, wherein the first damage prediction region is a first damage prediction box, the first damage prediction box having a first center, a first width, and a first height.

15. The computer-readable medium of claim 14, wherein the first width is a predicted width, and the first height is a predicted height; and determining the location loss term based on at least the distance between the center of the first damage prediction region and the center of the target damage mark box comprises:

determining a first loss term based on a distance between the first center and the center of the target damage mark box;

determining a second loss term based on the predicted width and the predicted height; and determining the location loss term based on a sum of the first loss term and the second loss term.

16. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

obtaining a marked picture, wherein the marked picture comprises one or more damage mark boxes, each damage mark box framing a respective portion of the marked picture depicting a damaged object;

using a damage detection model to predict at least one damage prediction region in the marked picture, wherein the at least one damage prediction region comprises a first damage prediction region;

determining a location loss term related to a location deviation in a loss function for a current prediction, wherein determining the location loss term related to the location deviation comprises determining whether any of the one or more damage mark boxes fully encompasses the first damage prediction region; and updating the damage detection model based on the loss function, such that the damage detection model is adjusted to reduce deviations between damage mark boxes and damage prediction regions.

17. The computer-implemented system of claim 16, the operations further comprising:

in response to determining that none of the one or more damage mark boxes fully encompasses the first damage prediction region:

determining a target damage mark box from the one or more damage mark boxes; and determining the location loss term based on at least a distance between a center of the first damage prediction region and a center of the target damage mark box.

18. The computer-implemented system of claim 17, wherein the first damage prediction region is a first damage prediction box, the first damage prediction box having a first center, a first width, and a first height.

19. The computer-implemented system of claim 18, wherein the first width is a predicted width, and the first height is a predicted height; and determining the location loss term based on at least the distance between the center of the first damage prediction region and the center of the target damage mark box comprises:

determining a first loss term based on a distance between the first center and the center of the target damage mark box;

determining a second loss term based on the predicted width and the predicted height; and determining the location loss term based on a sum of the first loss term and the second loss term.

* * * * *